United States Patent [19]

Ferrin et al.

[11] 4,360,363

[45] Nov. 23, 1982

[54] PHYSICAL SOLVENT FOR GAS SWEETENING

[75] Inventors: Charles R. Ferrin; William P. Manning, both of Sand Springs, Okla.

[73] Assignee: Combustion Engineering, Inc., Windsor, Conn.

[21] Appl. No.: 349,423

[22] Filed: Feb. 16, 1982

[51] Int. Cl.³ ............................................ B01D 19/00
[52] U.S. Cl. ...................................... 55/73; 423/226; 423/228
[58] Field of Search ...................... 55/73, 68; 423/226, 423/228, 229

[56] References Cited

U.S. PATENT DOCUMENTS 4,079,117  3/1978  Butwell ............................. 423/229

FOREIGN PATENT DOCUMENTS 728444  4/1955  United Kingdom ................... 55/73
1173173  12/1969  United Kingdom ............... 423/226

Primary Examiner—Bernard Nozick
Attorney, Agent, or Firm—Arthur L. Wade

[57] ABSTRACT

The alkanolpyridines, as physical solvents, compare favorably, as a family, with sulfolane in their absorption of hydrogen sulfide and mercaptans. The data show absorption differences of the alkanolpyridines diluted with water, as compared with the alkanolpyridines mixed with amine. Both sets of data indicate an absorption performance substantially equal to, or better than, the performance of sulfolane. The chemical structure of pyridine is shown below. This structure is shown with the understanding that the alkanolpyridines would have the propanol or carbinol radicals, which are also shown, or other alkanol radicals substituted at the 2, 3 or 4 position.

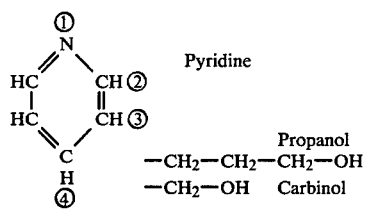

6 Claims, 3 Drawing Figures

PHYSICAL SOLVENT FOR GAS SWEETENING

TECHNICAL FIELD

The present invention relates to a physical solvent in an aqueous solution which effectively absorbs hydrogen sulfide and mercaptans from a mixture of gases. More particularly, the present invention relates to mixtures of alkanolpyridines with water and amines to produce a physical solvent as, or more, effective than sulfolane, as used in the Sulfinol process, for the absorption of hydrogen sulfide and mercaptans.

BACKGROUND ART

For a number of years, the physical solvent sulfolane has been used to form a mixture with an amine and water to reduce the hydrogen sulfide in gas mixtures within what has been termed the "Sulfinol" process. The commercial control of the Sulfinol process has been successfully exerted under licenses issued to the Shell Oil Company. The time has now arrived to substitute a rival process to the Sulfinol process. It has become evident that a process can be developed which will equal, or exceed, effectiveness of the Sulfinol process.

The new physical solvent desired should be comparable to the sulfolane of the Sulfinol process in its reaction with other acid gases of which carbon dioxide is the most prevalent. Of course, if the new solvent will not deteriorate the buna-N O-rings, packing, etc. in downstream equipment, at least this other advantage for the desired physical solvent over sulfolane is a significant factor of their competition.

DISCLOSURE OF THE INVENTION

The present invention contemplates forming an aqueous solution of an alkanolpyridine which is applied to effectively reduce the hydrogen sulfide and mercaptans content of gas mixtures.

The invention further contemplates that the above aqueous solution be circulated through a continuous heat regeneration step in the process.

More particularly, the invention contemplates a combination of the alkanolpyridines with water and an amine to effectively absorb hydrogen sulfide and mercaptans from gas mixtures with an efficiency superior to sulfolane in a water and amine mixture.

Other objects, advantages and features of this invention will become apparent to one skilled in the art upon consideration of the written specification, appended claims, and the attached drawings.

BRIEF DESIGNATION OF THE DRAWINGS

BEST MODE FOR CARRYING OUT THE INVENTION

Two-stage Investigation of the Novel Solvent

As the present invention is compared to the performance of sulfolane in its Sulfinol process, the first stage of comparison was formed by taking a selected number of alkanolpyridines in a water solution of 50% by weight and a similar solution of sulfolane. The solubility of these solutions was compared in a laboratory apparatus devised specifically for this purpose.

The equipment for testing solubility consisted of a cylinder with an internal piston. The enclosed volume depended on the extent to which the piston was inserted into the cylinder. After the volume of the cylinder was calibrated in terms of the piston travel, the cylinder was alternately filled with pure hydrogen sulfide and carbon dioxide, and known quantities of the aqueous solutions to be tested were injected. When the system had reached equilibrium, the pressure was accurately measured to determine the absorption of the gas. The position of the piston was then changed to obtain data at various pressures. The resultant data were tabulated as follows:

| Partial Pressure psia | Solubility cc/cc atm | | | | | |
|---|---|---|---|---|---|---|
| | 3 Propanol Pyridine | 2 Propanol Pyridine | 4 Propanol Pyridine | 3 pyridyl Carbinol | Sulfolane | Water |
| Carbon DIOXIDE ABSORPTION | | | | | | |
| 15 | 1.04 | 1.99 | .76 | .81 | 1.33 | |
| 20 | 1.16 | 2.3 | 1.17 | .89 | 1.05 | |
| 40 | 1.15 | 1.64 | 1.16 | 1.00 | 1.07 | |
| 60 | 1.06 | 1.36 | 1.05 | .97 | 1.17 | |
| 80 | 1.02 | 1.24 | .99 | .92 | 1.02 | |
| 100 | .98 | 1.08 | .93 | .87 | 1.00 | |
| H$_2$S ABSORPTION | | | | | | |
| 15 | 5.76 | 4.66 | 6.03 | 5.36 | 4.16 | 2.47 |
| 20 | 5.48 | 4.54 | 5.71 | 5.09 | 4.42 | 1.76 |
| 40 | 5.37 | 4.56 | 5.34 | 4.84 | 4.88 | 1.48 |
| 60 | 5.31 | 4.60 | 5.30 | 4.73 | 5.13 | 1.64 |
| 80 | 4.95 | 4.61 | 5.28 | 4.51 | 5.31 | 1.53 |
| 100 | 5.09 | 4.71 | 5.33 | 4.54 | 5.63 | 1.64 |

Figure 1:
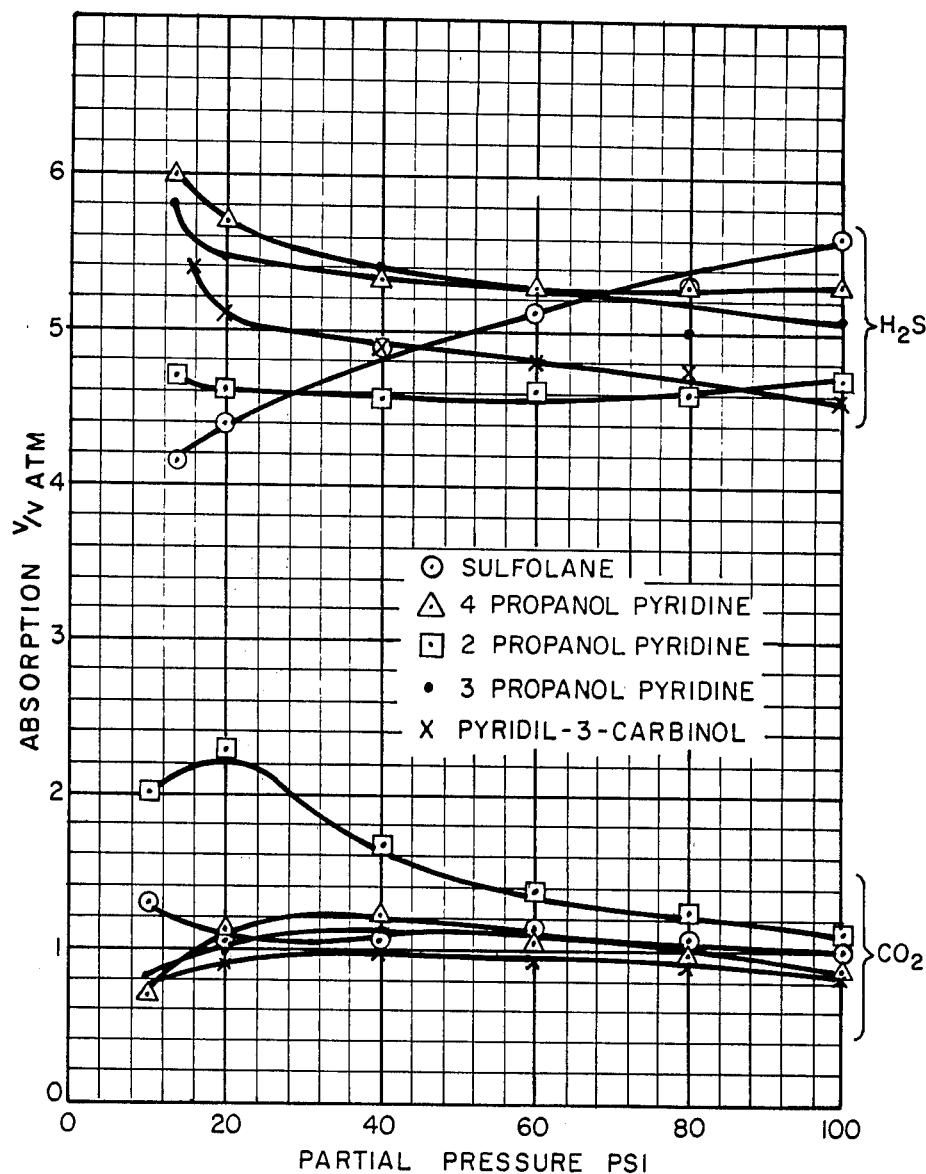
FIG. 1 is a chart of the absorptive data of selected alkanolpyridines and sulfolane relative to hydrogen sulfide and carbon dioxide.

These data were charted as disclosed in FIG. 1. The result of this laboratory test makes it evident that the specific alkanolpyridines tested compared favorably with sulfolane and that both physical solvents were similarly selective relative to carbon dioxide. Thus, the conclusion is supported that alkanolpyridines, especially 4-propanolpyridine, absorb hydrogen sulfide as effectively as sulfolane.

An additional feature in this first stage of testing is found in the investigation of the absorptive capacity of sulfolane and the alkanolpyridines in relation to methyl mercaptans. A 50% water solution of the sulfolane and selected alkanolpyridines were tested in the cylinder/piston chamber. The data tabulated below are a positive indication that the alkanolpyridines, as a family, are close to each other in their absorptive capacity, and definitely better than sulfolane.

| Sulfolane | 15.6 cc/cc atm |
|---|---|
| 4 Propanolpyridine | 19.7 cc/cc atm |
| 3 Propanolpyridine | 21.4 cc/cc atm |
| 2 Propanolpyridine | 20.6 cc/cc atm |
| 3 pyridyl carbinol | 19.4 cc/cc atm |

Although 3-propanolpyridine appeared to be the better of the alkanolpyridines in its solubility capacity, the 4-propanolpyridine is still somewhat favored within the family because of its performance with hydrogen sulfide. Also, its boiling point is the highest of the family. It is to be emphasized that the entire family of alkanolpyridines has been established as better than sulfolane in the solubility of hydrogen sulfide and other acid gases.

The first stage of comparison between a few of the alkanolpyridines and sulfolane established a positive benchmark. Beyond this point, if it only proves that the alkanolpyridines would not attack buna-N as packing downstream of a practical reduction to practice, a positive leg-up would be given the alkanolpyridines as an improvement over sulfolane. Additionally, it began to appear that there may be other advantages, such as the higher boiling point of some of the alkanolpyridines which would reduce vapor losses and, therefore, conserve the solvent. At least some of these indications motivated the second stage of the investigation under conditions more closely resembling a practical actual reduction to practice.

Second Stage of Investigation

The second stage of investigation had the surprising result of substantiating the conclusion that there is invention in using the alkanolpyridines, especially 4-propanolpyridine, in combination with amines in an otherwise conventional contact and regeneration apparatus. Apparently, there is synergism between the alkanolpyridines and amines in an aqueous solution which gives distinctive hydrogen sulfide absorptive performance over the sulfolane in aqueous solution with amines.

Second Stage Field-like Test Apparatus

Figure 2:
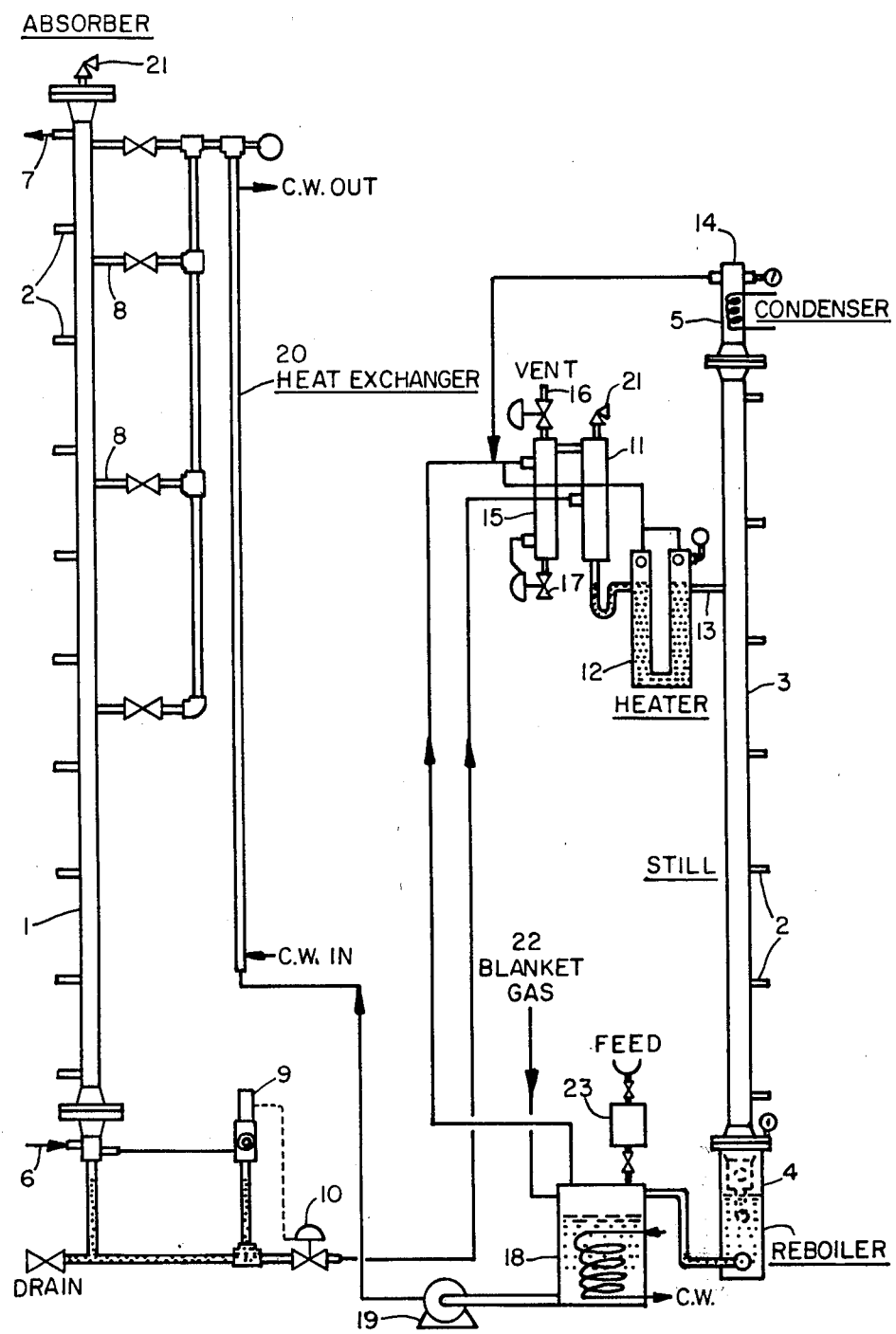
FIG. 2 is a schematic elevation of apparatus in which the invention is embodied by the use of a solvent containing an alkanolpyridine.
Figure 3:
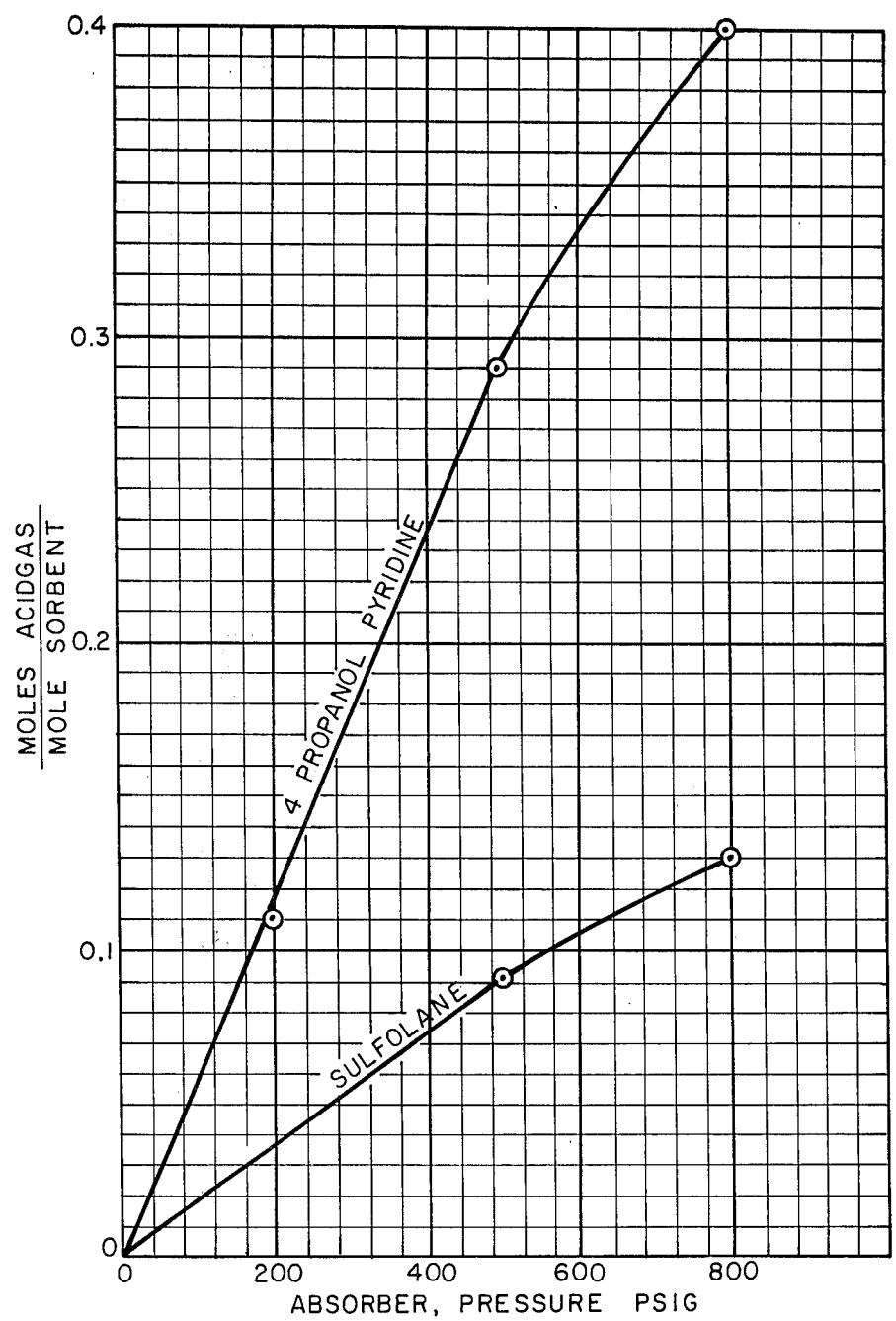
FIG. 3 is a chart of the absorptive data by selected alkanolpyridines and sulfolane when utilized in the apparatus of FIG. 2.

FIG. 2 utilizes a somewhat diagrammatic elevation to disclose the apparatus in which the new physical solvent is employed to extract hydrogen sulfide from a gas mixture. As always, the term "sweetening" means the removal of acid gases, such as hydrogen sulfide and carbon dioxide, from any mixture of gases being so treated. If gases contain hydrogen sulfide and carbon dioxide, they are, to that extent, referred to as a sour gas mixture. The new physical solvent of this disclosure is, of course, applied to sweeten gas mixtures. Although reference has been made to hydrogen sulfide and carbon dioxide as being the principal acid gas components of a sour gas stream, the term acid gases include whatever mercaptans and other sulfides may be present in the mixture.

The test apparatus of FIG. 2 was used to reduce the invention to practice. This classification of the apparatus is used only because of its physical size. The invention was reduced to practice as completely as it would have been in a fullscale commercial unit.

A contact, or absorber, vessel 1 was formed from a 9' long, 2" diameter stainless steel pipe. This diameter precluded the use of any contact structure other than Pall rings. Gas sample ports 2 were established along the length of this absorber pipe at 1-foot intervals. A still column 3 was formed with a similar 7' long, 2" diameter pipe. A reboiler 4 was mounted below the still column, and a condenser 5 was mounted at the opposite end of the still column.

The gas mixture at the relatively high pressure to facilitate sweetening, was directed into absorber tower 1 through conduit 6. This flow of gas was directed up the absorber tower and over the Pall ring packing to exit through conduit 7. The test solvent was flowed into the upper portion of the absorber tower 1 through one of the four entrances 8. The solvent, flowing downward over the Pall ring packing, was thereby brought into intimate counter-current contact with the sour gas mixture flowing up through the absorber tower. The solvent, now rich with the hydrogen sulfide and carbon dioxide extracted from the gas mixture, was flowed from the lower portion of the column 1. More specifically, the rich absorbent collected in the bottom of column 1, was held to a level by controller 9 which regulated the discharge of the rich solvent from its collection in the bottom of the column with valve 10. As the solvent flows through this valve the pressure is reduced from that in the absorber to that in the still column.

The rich solvent degassed in the flash pot 11 and was heated in the U tube 12 before entering the still column at 13. The flow of cooling water to the condenser controlled the reflux ratio and the overhead gas temperature 14. All of the gases and vapors collected in vessel 15 which was equipped with a back pressure valve 16 and a drain 17. The regenerated solvent was collected in the reservoir 18 where it was cooled before it flowed to the positive-displacement solvent feed pump 19. Heat exchanger 20 controlled the temperature of the solvent entering the absorber.

All of the heat requirements were supplied from two 1000-watt immersion heaters in the U tube heater and three similar heaters in the reboiler. The absorber and the vapor collection vessel were equipped with relief valves 21. A small stream of blanket gas 22 prevented contamination of the lean solvent by vapor from vessel 15. Feed pot 23 enabled make-up solvent to be added to the reservoir during the test.

There were three steps to the test procedure; (1) the flow rate for the liquid was established, as well as the regeneration temperatures. The flow rate was established at 10.7 ml/min., and the temperatures at 250 F. for the reboiler, 220 F. for the outlet of the U tube preheater, and 150 F. for the condenser; (2) the pressure in the absorber vessel was established at either 200, 500, or 800 psig, and the test gas mixture, containing 10% $H_2S$, 10% $CO_2$ and 80% $CH_4$, was flowed into the absorber vessel at the established pressure; (3) the test gas flow rate was increased until the gas leaving the absorber vessel reached $\frac{1}{4}$ gr/100 scf. The following tabulation was made of the test results:

| Solution Composition wt % | | Absorber Pressure psig | Sorbent Flow Rate mol/hr | Pick Up Acid Gas Flow Rate mol/hr | mol Acid Gas/ mol Sorbent |
|---|---|---|---|---|---|
| MDEA | 50 | 500 | 2.70 | 1.65 | 0.12 |
| H) | 50 | 800 | 2.70 | 2.05 | 0.15 |
| MDEA | 50 | 500 | 4.04 | 9.75 | 0.09 |
| Sulf | 25 | 800 | 4.04 | 2.55 | 0.13 |
| H₂O | 25 | | | | |
| MDEA | 50 | 200 | 3.86 | 0.41 | 0.11 |
| 4 PP | 25 | 500 | 3.86 | 5.65 | 0.29 |
| H₂O | 25 | 800 | 3.86 | 7.75 | 0.40 |
| DIPA | 50 | 200 | 3.75 | 0.78 | 0.21 |
| Sulf. | 25 | 500 | 3.75 | 1.04 | 0.28 |
| H₂O | 25 | 800 | 3.75 | 1.31 | 0.35 |
| DIPA | 50 | 200 | 3.57 | 1.31 | 0.37 |
| 4 PP | 25 | 500 | 3.57 | 1.83 | 0.51 |
| H₂O | 25 | 800 | 3.57 | 2.09 | 0.59 |

Legend
MDEA methyldiethanolamine
Sulf sulfolane
4 PP 4-propanolpyridine
DIPA diisopropanolamine The main thrust of all the tests is the comparison of 4-propanolpyridine and sulfolane using methyldiethanolamine and diisopropanolamine as the amines. Data for methyldiethanolamine without either physical solvent are included. Note that the changes in the sorbent flow rate are due to differences in the solution composition and not the solution flow rate. (Sorbent includes the amine and physical solvent but not the water.)

Comparing methyldiethanolamine with methyldiethanolamine and sulfolane, the presence of the sulfolane increased the allowable flow rate of the acid gas but not sufficiently to avoid a slightly decrease in the pickup as measured in mols of acid gas per mol of sorbent.

The methyldiethanolamine and 4-propanolpyridine exhibited superior absorption characteristics. The permissible acid gas flow rate increased such that the pickup was twice that for the methyldiethanolamine alone and three times that for the methyldiethanolamine and sulfolane.

The last two sets of runs compare 4-propanolpyridine and sulfolane using diisopropanolamine. Again, the 4-propanolpyridine is the better physical solvent even though the differences in the pickups are not as dramatic. The reason for this is that diisopropanolamine is a secondary amine and, therefore, a better absorber of acid gases than methyldiethanolamine which is a tertiary amine.

Though 4-propanolpyridine was the only alkanolpyridine tested in the second stage of the investigation, it is logical to except other analogs to behave similarly. Two additional advantages of 4-propanolpyridine over sulfolane can now be further emphasized: (1) that its boiling point is higher than that of sulfolane, therefore, the operational losses will be less, and (2) it is not corrosive to parts utilizing buna-N as packing for O-rings and other parts, therefore, no downstream scrubbing equipment is needed.

Conclusion

The complete test procedure established the superiority of the alkanolpyridines relative to sulfolane as a physical solvent with which to remove hydrogen sulfide from a mixture of gases. Additionally, the behavior of the alkanolpyridines relative to carbon dioxide was at least as good as sulfolane. Finally, there was positive indication that the solubility of mercaptans by the alkanolpyridines was greater than sulfolane.

The comparative economics between the new physical solvent and sulfolane is beyond the scope of this disclosure. However, the higher boiling point of the alkanolpyridines and the fact that they do not attack, corrode, or deteriorate downstream packing, such as buna-N, certainly are economic factors for the alkanolpyridines.

From the foregoing, it will be seen that this invention is one well adapted to attain all of the ends and objects hereinabove set forth, together with other advantages which are obvious and inherent to the process and chemical.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. The process for the absorption and removal of hydrogen sulfide and other acid gases from a mixture of gases which comprises,
   scrubbing the mixture of gases with a physical solvent comprising an aqueous solution of an alkanolpyridine in an absorption zone in which the hydrogen sulfide and other acid gases are absorbed,
   conducting the solvent containing the absorbed gas to a desorption zone,
   liberating the absorbed hydrogen sulfide and other acid gases from the solvent to thereby regenerate the solvent,
   and recycling the regenerated solvent to the absorption zone.

2. The process of claim 1 in which the physical solvent comprises an aqueous solution of 4-propanolpyridine.

3. The process for the absorption and removal of hydrogen sulfide and other acid gases from a mixture of gases which comprises,
   scrubbing the mixture of gases with a physical solvent comprising an alkanolpyridine and an amine and water in an absorption zone in which the hydrogen sulfide and other acid gases are absorbed,
   conducting the solvent containing the absorbed gases to a desorption zone,
   liberating the absorbed hydrogen sulfide and other acid gases from the solvent to thereby regenerate the solvent,
   and recycling the regenerated solvent to the absorption zone.

4. The process of claim 3 in which the physical solvent comprises 4-propanolpyridine and an amine and water.

5. The process of claim 4 in which the amine is methyldiethanolamine.

6. The process of claim 4 in which the amine is diisopropanolamine.

* * * * *